United States Patent Office.

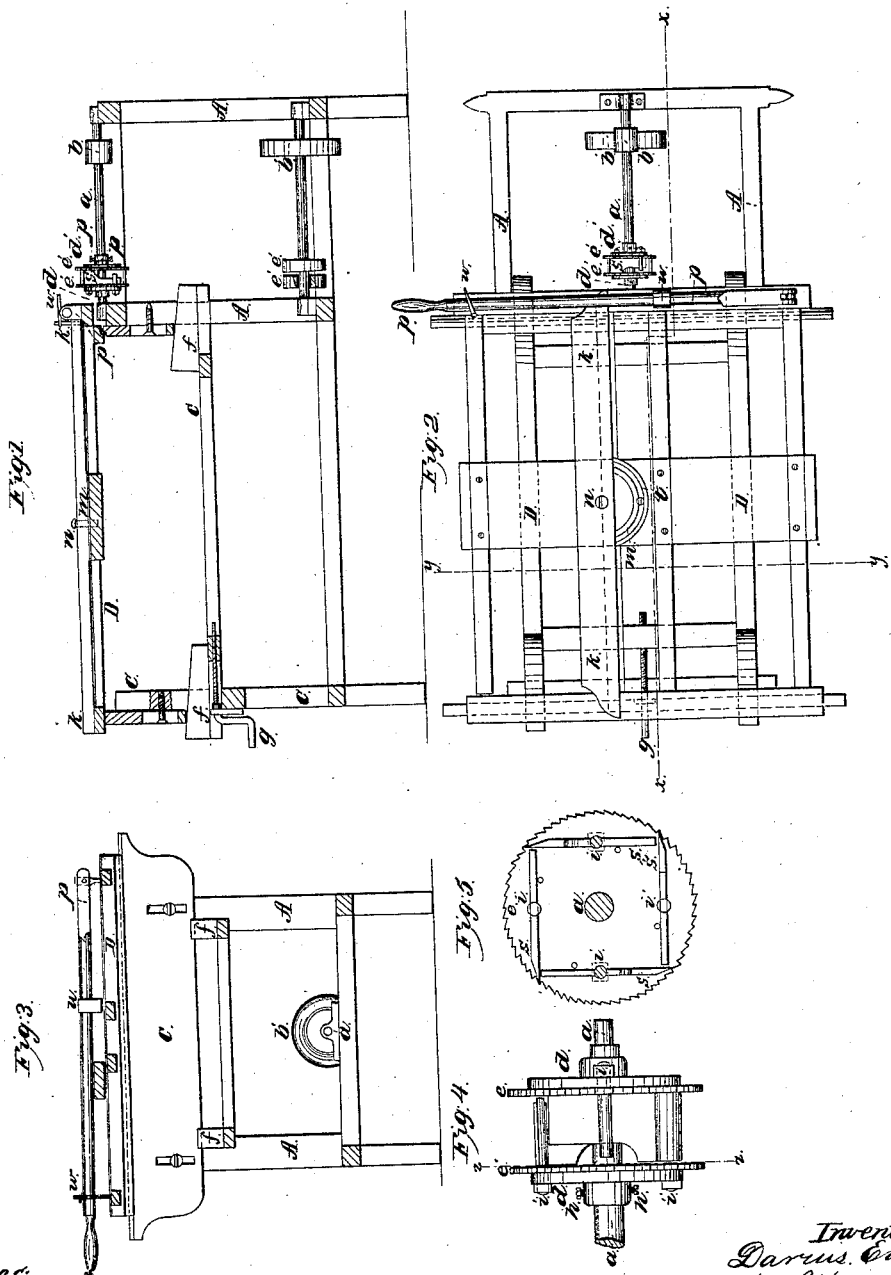

IMPROVEMENT IN TENONING MACHINE.

DARIUS EVERS, OF VAN WERT, OHIO.

Letters Patent No. 59,826, dated November 20, 1866.

SPECIFICATION.

TO ALL WHOM IT MAY CONCERN:

Be it known that I, DARIUS EVERS, of Van Wert, in the county of Van Wert, and State of Ohio, have invented a new and improved Gaining and Rebating Machine, and I do hereby declare that the following is a full, clear, and exact description thereof, which will enable others skilled in the art to make and use the same, reference being had to the accompanying drawings forming part of this specification, in which—

Figure 1 is a vertical longitudinal section of the machine, taken in the line $x\ x$, fig. 2.

Figure 2 is a plan.

Figure 3 is a vertical cross-section, taken in the line $y\ y$, fig. 2.

Figure 4 is a detached top view of the cutting tools.

Figure 5 is a detached side view of the same, in the line $z\ z$, fig. 4.

Similar letters of reference indicate like parts.

This invention relates to a machine for rebating and gaining lumber for joiners and cabinet-makers, and other workers in wood requiring joints or tenons in their work. It is a great labor-saving machine, and will perform the work of ten men better than hand labor.

Upon a frame, A A, or any suitable framing, is hung the saw mandrel, $a$, worked by pulleys, $b\ b'$, and fast and loose pulleys, $c\ c'$, receiving power from any prime mover. On the inner end of the mandrel $a$ is fastened a stationary flanged collar, $d$, against which a circular saw, $e$, is secured by two draft-bolts, $i\ i$, passing through opposite sides of the collar; and the similar collar $d'$ is made to slide on the mandrel, to which it is feathered to prevent turning; the saw $e'$ is secured to the inside of the sliding collar $d'$ in a similar manner by the draft-bolts $i'\ i'$, and is held in place on the mandrel by set screws, $h\ h$. The bolts $i\ i$ and $i'\ i'$ project beyond the inside faces of the saws, $e\ e'$, and in their projected ends are mortises for receiving the shanks of chisel-shaped bits or cutters, $s\ s'$, set parallel to each other on each saw and at right angles to each other on opposite saws, as shown in figure 5. Their cutting edges are set at right angles to the saws, and flush with the points of the saw teeth. Small steady pins are placed behind the shanks of the bits.

The sliding collar $d$, may be adjusted to cut gains of any desired width not exceeding the width of both bits, or the bits may be changed to cut any desirable width.

A sliding carriage, D, is placed upon the saw table C, which may be of ordinary construction, to carry the lumber to be worked over the gain cutter, which cuts the gains or rebates on the under side of the stuff to any desired depth without regard to its thickness, provision being made to raise or lower the saw table as necessary by means of the four sliding wedges, $f\ f\ f\ f$, under the four corners, which are set up by the crank screw $g$.

For cutting the lumber at any angle I attach on the upper side of the carriage D a movable rest, $k\ k$, which is fastened to a semicircular slotted plate, $m$, both turning upon a centre pin, $n$, so that the rest $k\ k$ shall lie at any desired angle to the line of movement of the carriage D, for passing the lumber over the gaining-cutters, at which angle it is held in place by the thumb-screw $t$, in the slot of the semicircular plate, $m$. For regulating the lengths of the stuff and the distances apart for cutting the gains, without laying off the work, I also attach a stop-gauge spring to the movable rest $k\ k$, which is not shown in the drawing. On the front side of the carriage D is attached a spring lever, $p\ p$, pivoted at one end, on which is placed a shifting fulcrum, $u$; the lever, $p\ p$, is brought down upon the end of the lumber to hold it firmly while it is cut, being fastened down by the catch, $w$.

To operate the machine, the cutting tools and the sliding carriage being properly adjusted for working to the right width and depth, the lumber is placed on the sliding carriage D, against the rest $k\ k$, and passed over the tools, which cut the rebate or gain at one operation.

Having thus described my invention, what I claim as new and desire to secure by Letters Patent is—

The cutter-head constructed of the sliding collars $d\ d$, saws $e\ e$, cutters $s\ s$, and mortised bolts $i\ i$, when arranged and operating substantially as described for the purpose specified.

The above specification of my invention, signed by me this 30th day of April, 1866.

<div style="text-align:right">DARIUS EVERS.</div>

Witnesses:
 Jos. RUSSELGROW,
 DAVIS JOHNSON.